(12) United States Patent
Binek et al.

(10) Patent No.: US 9,140,272 B2
(45) Date of Patent: Sep. 22, 2015

(54) RAM AIR FAN OUTER HOUSING

(75) Inventors: Lawrence Binek, Windsor, CT (US); Brent J. Merritt, Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 959 days.

(21) Appl. No.: 13/279,508

(22) Filed: Oct. 24, 2011

(65) Prior Publication Data
US 2013/0098045 A1  Apr. 25, 2013

(51) Int. Cl.
F04D 29/52  (2006.01)

(52) U.S. Cl.
CPC ......... F04D 29/522 (2013.01); *Y10T 29/49245* (2015.01)

(58) Field of Classification Search
CPC ....... F04D 29/522; F04D 29/526; F02K 3/06; F02K 7/10; B64D 33/02
USPC ............... 60/767, 226.1; 244/53 B; 137/15.1; 454/70–77
See application file for complete search history.

(56) References Cited

U.S. PATENT DOCUMENTS

| | | |
|---|---|---|
| 1,940,466 A | 12/1933 | Sneed |
| 2,527,229 A | 10/1950 | Roubal |
| 2,752,515 A | 6/1956 | Baudry et al. |
| 3,410,029 A | 11/1968 | Savage |
| 3,433,020 A | 3/1969 | Earle, Jr. et al. |
| 3,588,044 A | 6/1971 | Reichrath et al. |
| 3,763,835 A | 10/1973 | Miller et al. |
| 3,915,024 A | 10/1975 | Mort |
| 3,949,550 A | 4/1976 | Albrecht et al. |
| 3,999,872 A | 12/1976 | Allison |
| 4,012,154 A | 3/1977 | Durwin et al. |
| 4,439,106 A | 3/1984 | Ferris et al. |
| 4,511,193 A | 4/1985 | Geczy |
| 4,543,785 A | 10/1985 | Patrick |
| 4,979,872 A | 12/1990 | Myers et al. |
| 5,239,815 A | 8/1993 | Barcza |
| 5,505,587 A | 4/1996 | Ghetzler |
| 5,529,316 A | 6/1996 | Mattila |
| 5,683,184 A | 11/1997 | Striedacher et al. |
| 6,299,077 B1 | 10/2001 | Harmon et al. |
| 6,380,647 B2 | 4/2002 | Hayashi et al. |
| 6,698,933 B2 | 3/2004 | Lau |
| 6,926,490 B2 | 8/2005 | McAuliffe et al. |

(Continued)

OTHER PUBLICATIONS

Colson et al., U.S. Appl. No. 13/279,588, filed Oct. 24, 2011.

(Continued)

*Primary Examiner* — Phutthiwat Wongwian
*Assistant Examiner* — Arun Goyal
(74) *Attorney, Agent, or Firm* — Kinney & Lange, P.A.

(57) ABSTRACT

A ram air fan outer housing for directing air from a ram air fan rotor and air from a ram air bypass into a ram air fan outlet. The outer housing includes an outer cylinder and a plenum connected at a joint region. The outer cylinder and the plenum are made of a laminate stacking sequence of at least four adjacent layers of plain-weave carbon-fiber fabric. Each layer of the stacking sequence has a weave orientation such that a first layer and a fourth layer are oriented forty-five degrees from each of a second layer and a third layer. The joint region is made of at least eight adjacent layers of plain-weave carbon-fiber fabric. The joint region laminate stacking sequence is formed by interleaving the four adjacent outer cylinder layers in the joint region with the four adjacent plenum layers in the joint region.

32 Claims, 6 Drawing Sheets

(56) References Cited

U.S. PATENT DOCUMENTS

| | | |
|---|---|---|
| 6,928,963 B2 | 8/2005 | Karanik |
| 6,966,174 B2 | 11/2005 | Paul |
| 7,165,939 B2 | 1/2007 | Chen et al. |
| 7,342,332 B2 | 3/2008 | McAuliffe et al. |
| 7,394,175 B2 | 7/2008 | McAuliffe et al. |
| 7,397,145 B2 | 7/2008 | Struve et al. |
| 7,757,502 B2 * | 7/2010 | Merritt et al. ............ 62/172 |
| 7,952,241 B2 | 5/2011 | Kato et al. |
| 8,015,838 B2 * | 9/2011 | Lippold et al. .......... 62/401 |
| 8,257,537 B2 * | 9/2012 | Shinoda et al. ......... 156/228 |
| 2002/0171218 A1 | 11/2002 | Bell |
| 2006/0061221 A1 | 3/2006 | McAuliffe et al. |
| 2010/0055383 A1 | 3/2010 | Schalla et al. |

OTHER PUBLICATIONS

Colson et al., U.S. Appl. No. 13/279,529, filed Oct. 24, 2011.
Colson et al., U.S. Appl. No. 13/279,538, filed Oct. 24, 2011.
Rosen et al., U.S. Appl. No. 13/279,488, filed Oct. 24, 2011.
Binek et al., U.S. Appl. No. 13/279,497, filed Oct. 24, 2011.
Chrabascz et al., U.S. Appl. No. 13/279,523, filed Oct. 24, 2011.
Chrabascz et al., U.S. Appl. No. 13/279,534, filed Oct. 24, 2011.
Rosen et al., U.S. Appl. No. 13/279,576, filed Oct. 24, 2011.

* cited by examiner

RAM AIR FAN OUTER HOUSING

BACKGROUND

The present invention relates to an environmental control system. In particular, the invention relates to an outer housing of a ram air fan assembly for an environmental control system for an aircraft.

An environmental control system (ECS) aboard an aircraft provides conditioned air to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it. Under conditions where the aircraft is moving fast enough, the pressure of air ramming into the aircraft is sufficient to move enough air through the ECS and over the heat exchangers to remove the excess heat.

While ram air works well under normal flight conditions, at lower flight speeds, or when the aircraft is on the ground, ram air pressure is too low to provide enough air flow across the heat exchangers for sufficient heat removal from the ECS. Under these conditions, a fan within the ECS is employed to provide the necessary airflow across the ECS heat exchangers. This fan is called a ram air fan.

As with any system aboard an aircraft, there is great value in an improved ram air fan that includes innovative components, such as an outer housing designed to improve the operational efficiency of the ram air fan or to reduce its weight.

SUMMARY

The present invention is a ram air fan outer housing for directing air from a ram air fan rotor and air from a ram air bypass into a ram air fan outlet. The outer housing includes an outer cylinder and a plenum connected at a joint region. The outer cylinder and the plenum are made of a laminate stacking sequence of at least four adjacent layers of plain-weave carbon-fiber fabric. Each layer of the stacking sequence has a weave orientation such that a first layer and a fourth layer are oriented forty-five degrees from each of a second layer and a third layer. The second layer and the third layer are sandwiched between the first layer and the fourth layer. The joint region is made of at least eight adjacent layers of plain-weave carbon-fiber fabric. The joint region laminate stacking sequence is formed by interleaving the four adjacent outer cylinder layers in the joint region with the four adjacent plenum layers in the joint region.

DETAILED DESCRIPTION

A ram air fan assembly in an environmental control system (ECS) employs an outer housing to channel air from a ram air fan rotor and air from a ram air bypass into a ram air fan outlet. The outer housing is the single largest component of the ram air fan assembly. The present invention is a ram air fan outer housing that is durable, while also being lightweight. An outer housing embodying the present invention incorporates innovative features that increase durability and ensure a lightweight housing. The outer housing is made of fiber-reinforced polymer composite plies, such as carbon-fiber plies, oriented in a specific sequence of layers, with the number of layers and the overlap of adjacent layers varying as a function of the need for strength. The use of a reinforcing fiber, such as carbon-fiber, in this manner provides a very strong and lightweight structure. The outer housing includes an outer cylinder and a plenum attached to the outer cylinder. Portions of the outer cylinder and the plenum are mechanically reinforced with raised features. Finally, the outer housing is designed with an exceptionally small ratio of a length of the outer cylinder to a diameter of the outer cylinder at a ram air fan outlet. A relatively large outer cylinder diameter at the ram air fan outlet enables efficient fan flow. Keeping the length of the outer cylinder relatively short reduces stresses on the outer housing, particularly at joints between the cylindrical section and the plenum. By reducing stresses, less material is required to reinforce these joints, contributing to a relatively lightweight outer housing.

Figure 1:
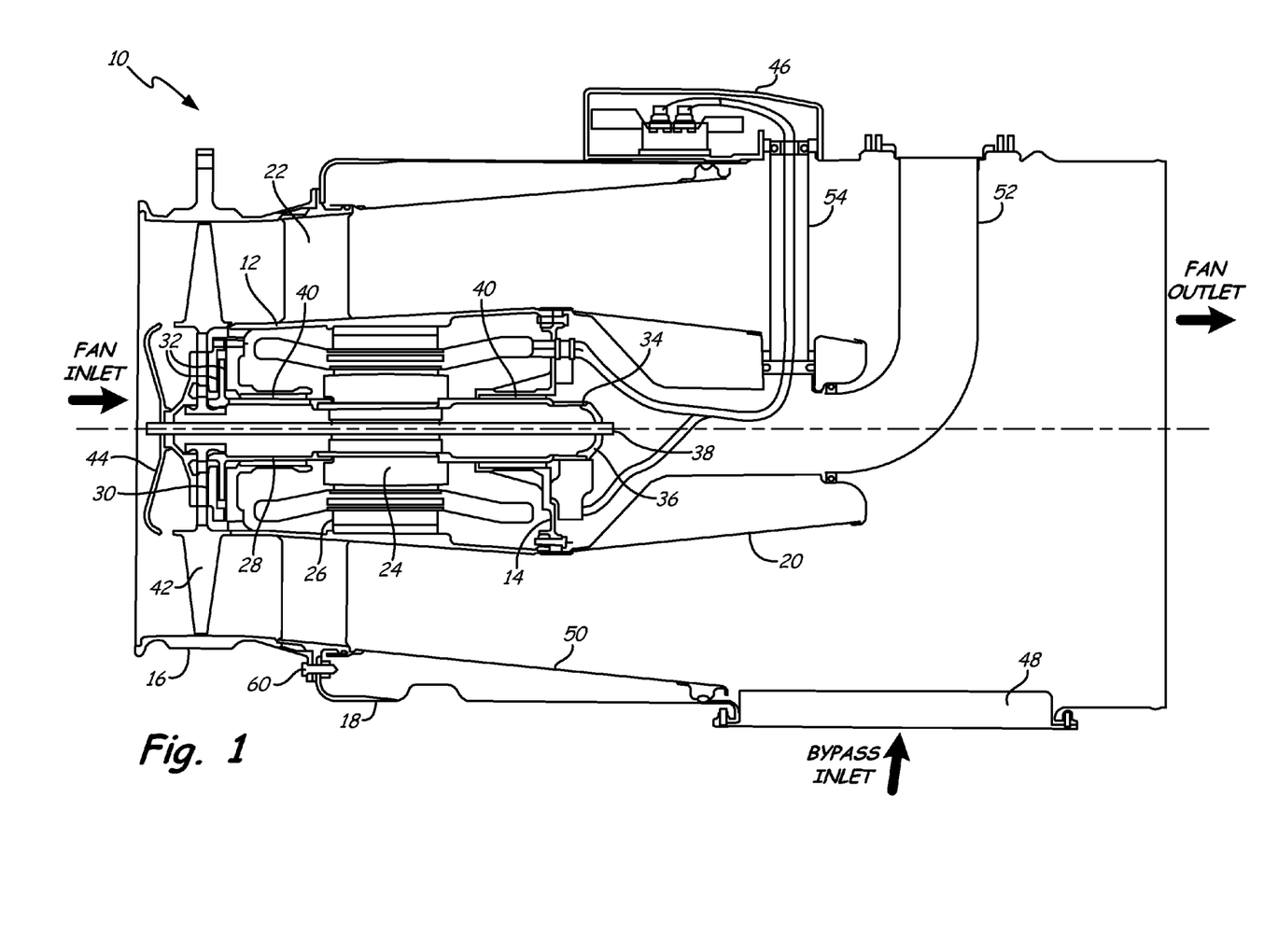
FIG. 1 is a side view of a ram air fan assembly incorporating the present invention.

FIG. 1 illustrates a ram air fan air assembly incorporating the present invention. FIG. 1 shows ram air fan assembly 10 including fan housing 12, bearing housing 14, inlet housing 16, outer housing 18, inner housing 20, and a plurality of bolts 60. Fan housing 12 includes fan struts 22, motor rotor 24, motor stator 26, thrust shaft 28, thrust plate 30, and thrust bearings 32. Bearing housing 14 includes journal bearing shaft 34 and shaft cap 36. Fan housing 12 and bearing housing 14 together include tie rod 38 and journal bearings 40. Inlet housing 16 contains fan rotor 42 and inlet shroud 44, in addition to a portion of tie rod 38. Outer housing 18 includes terminal box 46 and plenum 48. Within outer housing 18 are diffuser 50, motor bearing cooling tube 52, and wire transfer tube 54. A fan inlet is a source of air to be moved by ram air fan assembly 10 in the absence of sufficient ram air pressure. A bypass inlet is a source of air to that moves through ram air fan assembly 10 when sufficient ram air pressure is available.

As illustrated in FIG. 1, inlet housing 16 and outer housing 18 are attached to fan housing 12 at fan struts 22 by a plurality of bolts 60. Bearing housing 14 is attached to fan housing 12 and inner housing 20 connects motor bearing cooling tube 52 and wire transfer tube 54 to bearing housing 14. Motor bearing cooling tube 52 connects inner housing 20 to a source of cooling air at outer housing 18. Wire transfer tube 54 connects inner housing 20 to outer housing 18 at terminal box 46. Motor stator 26 and thrust plate 30 attach to fan housing 12. Motor rotor 24 is contained within motor stator 26 and connects journal bearing shaft 34 to thrust shaft 28. Journal bearing shaft 34, motor rotor 24, and thrust shaft 28 define an axis of rotation for ram air fan assembly 10. Fan rotor 42 is attached to thrust shaft 28 with tie rod 38 extending along the axis of rotation from shaft cap 36 at the end of journal bearing shaft 34 through motor rotor 24, thrust shaft 28, and fan rotor 42 to inlet shroud 44. Nuts (not shown) secure shaft cap 36 to journal bearing shaft 34 on one end of tie rod 38 and inlet shroud 44 to fan rotor 42 at opposite end of tie rod 38. Thrust plate 30 and fan housing 12 contain a flange-like portion of thrust shaft 28, with thrust bearings 32 positioned between the flange-like portion of thrust shaft 28 and thrust plate 30; and between the flange-like portion of thrust shaft 28 and fan housing 12. Journal bearings 40 are positioned between journal bearing shaft 24 and bearing housing 14; and between thrust shaft 28 and fan housing 12. Inlet shroud 44, fan rotor 42, and a portion of fan housing 12 are contained within inlet housing 16. Diffuser 50 is attached to an inner surface of outer housing 18. Plenum 48 is a portion of outer housing 18 that connects ram air fan assembly 10 to the bypass inlet. Inlet housing 16 is connected to the fan inlet and outer housing 18 is connected to a fan outlet.

In operation, ram air fan assembly 10 is installed into an environmental control system aboard an aircraft and connected to the fan inlet, the bypass inlet, and the fan outlet. When the aircraft does not move fast enough to generate sufficient ram air pressure to meet the cooling needs of the ECS, a ram air fan motor controller (not shown) supplies power to motor stator 26 by wires running from terminal box 46, through wire transfer tube 54, inner housing 20, and bearing housing 14. Energizing motor stator 26 causes rotor 24 to rotate about the axis of rotation for ram air fan assembly 10, rotating connected journal bearing shaft 34 and thrust shaft 28. Fan rotor 42 and inlet shroud 44 also rotate by way of their connection to thrust shaft 28. Journal bearings 40 and thrust bearings 32 provide low friction support for the rotating components. As fan rotor 42 rotates, it moves air from the fan inlet, through inlet housing 20, past fan struts 22 and into the space between fan housing 12 and outer housing 18, increasing the air pressure in outer housing 18. As the air moves through outer housing 18, the air flows past diffuser 50 and inner housing 20, where the air pressure is reduced due to the shape of diffuser 50 and the shape of inner housing 20. Once past inner housing 20, the air moves out of outer housing 18 at the fan outlet. Components within bearing housing 14 and fan housing 12, especially thrust bearings 32, journal bearings 40, motor stator 26, and motor rotor 24; generate significant heat and must be cooled. Cooling air is provided by motor bearing cooling tube 52 which directs a flow of cooling air to inner housing 20. Inner housing 20 directs flow of cooling air to bearing housing 14, where it flows past components in bearing housing 14 and fan housing 12, cooling the components. Once the aircraft moves fast enough to generate sufficient ram air pressure to meet the cooling needs of the ECS, ram air is directed into plenum 48 from the bypass inlet. The ram air passes into outer housing 18 at plenum 48 and moves out of outer housing 18 at the fan outlet.

Figure 2:
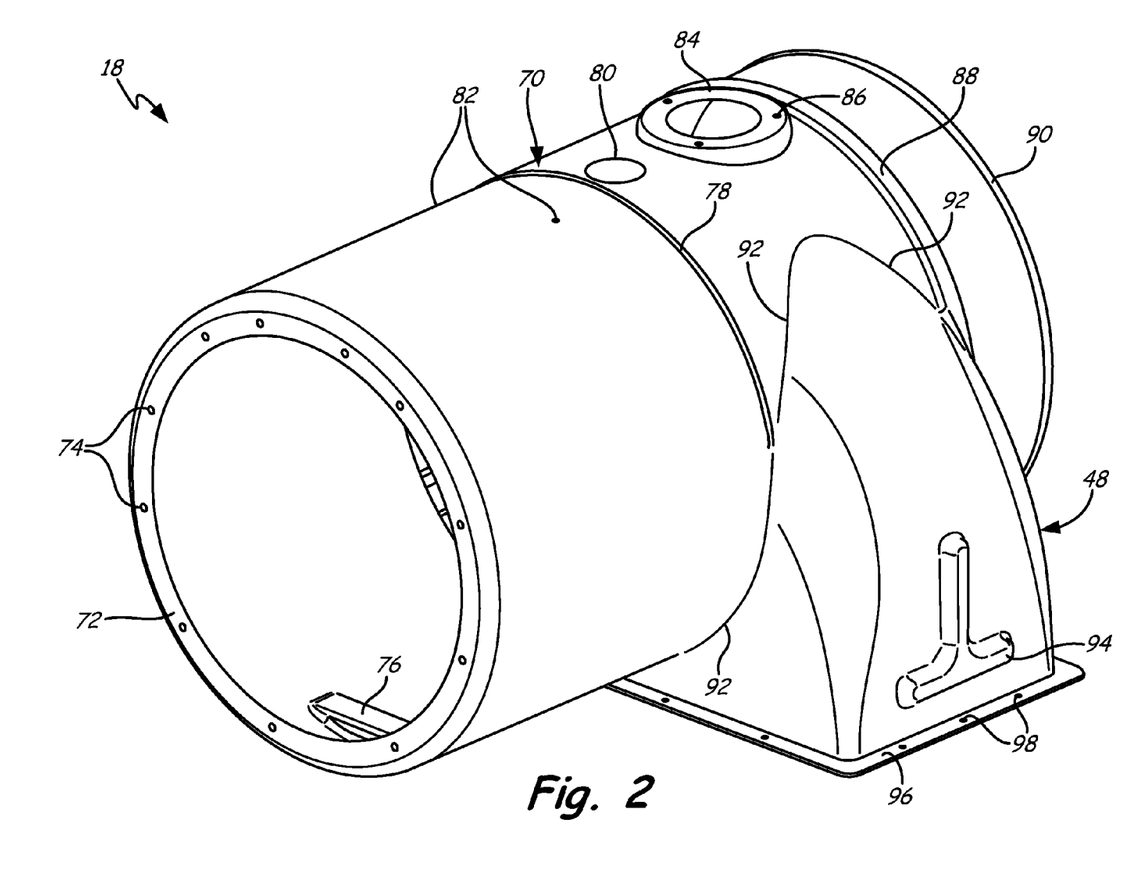
FIG. 2 is a perspective view of an outer housing incorporating the present invention.

As shown in FIG. 1, outer housing 18 includes terminal box 46 and plenum 48. FIG. 1 also shows that outer housing 18 has a ram air fan outlet end and a ram air fan inlet end opposite the ram air fan outlet end. FIG. 2 is a perspective view of outer housing 18, with terminal box 46 omitted for clarity. FIG. 2 shows that outer housing 18 further includes outer cylinder 70. Outer cylinder 70 includes inlet flange 72, inlet flange bolt holes 74, component channel 76, diameter transition 78, terminal box opening 80, terminal box bolt holes 82, cooling air flange 84, cooling air flange bolt holes 86, outer cylinder support ridge 88, and outlet bead 90. Plenum 48 includes plenum ridges 94, plenum flange 96, and plenum flange bolt holes 98. Outer cylinder 70 includes the ram air fan outlet end and the ram air fan inlet end of outer housing 18. Outer cylinder 70 has two external diameters, a first external diameter at the ram air fan outlet end and a second external diameter at the ram air fan inlet end. Outer cylinder 70 transitions from the first external diameter to the second external diameter at diameter transition 78. Thus, the first external diameter extends from the ram air fan outlet end to diameter transition 78 and the second external diameter extends from diameter transition 78 to the ram air fan rotor end at inlet flange 72. Outlet cylinder 70 has a single axis running the length of outer cylinder 70 at the midpoint of both the first external diameter and the second external diameter. Once attached to fan housing 12, the axis of outer cylinder 70 is, ideally, aligned with the axis of rotation for ram air fan assembly 10 described above in reference to FIG. 1.

As shown in FIG. 2, plenum 48 attaches to outer cylinder 70 at cylinder-to-plenum joint 92. Inlet flange 72 is the end of outer cylinder 70 corresponding to the ram air fan rotor end of outer housing 18. Inlet flange 72 connects outer housing 18 to fan housing 12 at an outer surface of inlet flange 72 with bolts 60, as shown in FIG. 1, through inlet flange bolt holes 74, as shown in FIG. 2. Component channel 76 is an indented portion of outer cylinder 70 to allow outer housing 18 to fit around a component external to outer housing 18 when ram air fan assembly 10 is installed in an ECS. Diameter transition 78 is a section of outer cylinder 70 where outer cylinder 70 transitions between two external diameters. Terminal box opening 80 is a hole in outer cylinder 70 through which electrical wires from within outer housing 18 connect to terminal box 46. Terminal box bolt holes 82 provide attachment points for terminal box 46 as described below in reference to FIG. 4. Cooling air flange 84 is a flanged connection for a cooling air duct (not shown) to provide cooling air to motor bearing cooling tube 52, shown in FIG. 1. The cooling air duct is secured through cooling air flange bolt holes 86. Outer cylinder support ridge 88 is a portion of outer cylinder 70 shaped for mechanical support of outer cylinder 70 and extending along at least a portion of outer cylinder 70 in a plane perpendicular to the axis of outer cylinder 70. Outlet bead 90 is a portion of outer cylinder 70 shaped to retain a "hose clamp" type connection to a duct (not shown) for exhausting ram air from ram air fan assembly 10. Outlet bead 90 is near the end of outer cylinder 70 corresponding to the ram air fan outlet end of outer housing 18. Outlet bead 90 extends along outer cylinder 70 in a plane perpendicular to the axis of outer cylinder 70. Plenum ridges 94 are protruding portions of large wall sections of plenum 48 for providing structural support for plenum 48. Plenum flange 96 is a connection flange for attaching plenum 48 to the bypass inlet. The connection is secured by bolts through plenum flange bolt holes 98.

Figure 3:
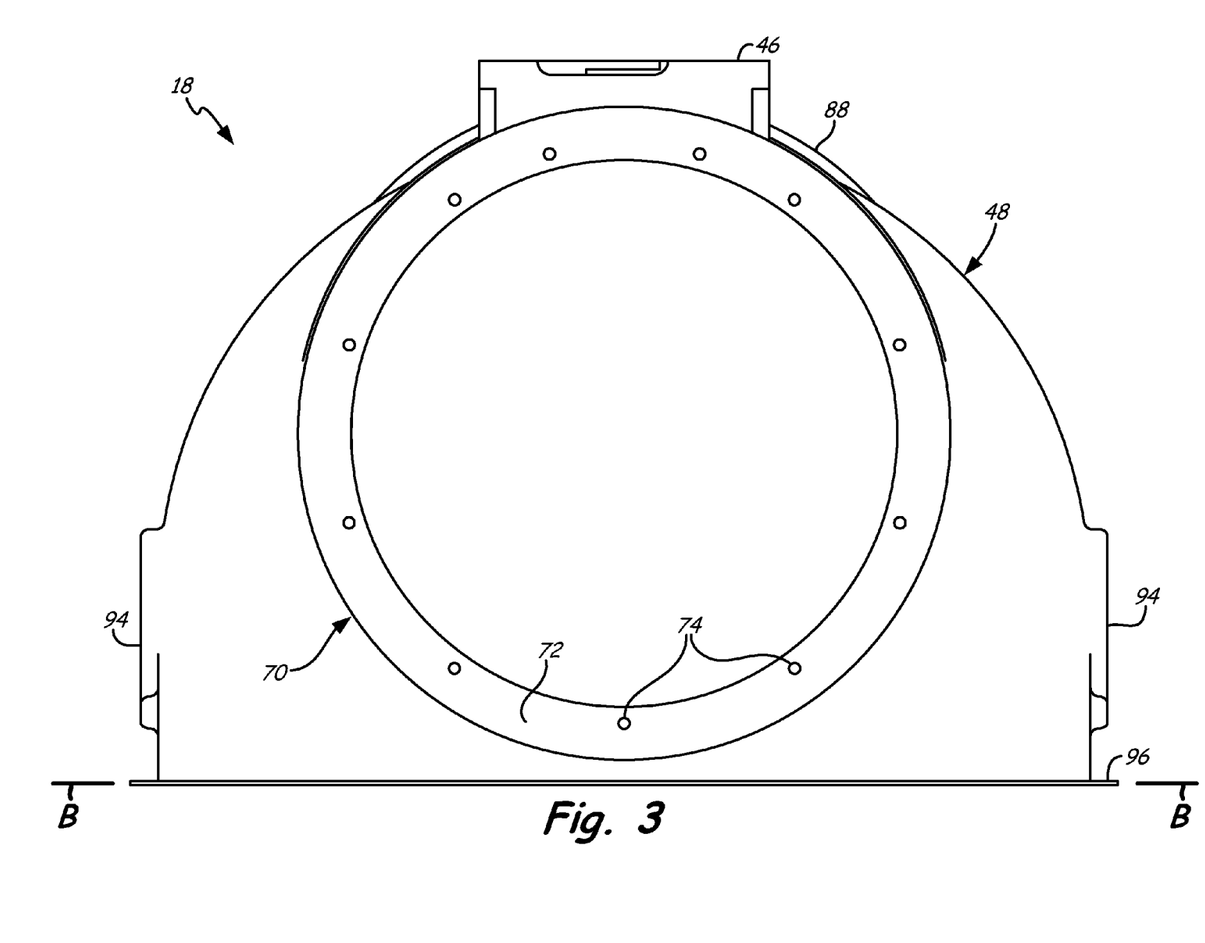
FIG. 3 is an end view of the outer housing of FIG. 2.

FIG. 3 is an end view of the outer housing of FIG. 2, looking at the ram air fan rotor end of outer housing 18. FIG. 3 shows the circular profile of outer cylinder 70. The axis of outer cylinder 70 is at the center of the circular profile of outer cylinder 70. Plenum 48 curves into outer cylinder 70 near a side of outer cylinder 70 opposite plenum flange 96. The surface of plenum flange 96 facing away from outer cylinder 70 defines reference flange plane B. Plenum 48 also curves into flat walls tangent to the radius of curvature of plenum 48 with the flat walls meeting plenum flange 96 at a right angle. The center of the radius of curvature for the curved portion of plenum 48 does not coincide with the center of the circular profile of outer cylinder 70. As shown in FIG. 3, one each of plenum ridges 94 is formed on each of two sides of plenum 48, the two sides on opposite sides of outer cylinder 70. FIG. 3 also shows that plenum ridges 94 protrude such that they are perpendicular to reference flange plane B and are parallel to each other and to the axis of outer cylinder 70. In one embodiment, plenum ridges 94 protrude such that planes coincident with the extent to which plenum ridges 94 protrude are between 12.450 inches and 12.470 inches (or between 316.230 mm and 316.738 mm) from a parallel plane containing the axis of outer cylinder 70. Plenum ridges 94 provide rigidity to the two largest flat walls of plenum 48, preventing them from buckling under high or low pressure conditions. Alternatives, such as adding stiffing components or thickening the largest flat walls, would add expense and weight. By adding plenum ridges 94, plenum 48 is able to withstand buckling with little added weight.

Figure 4:
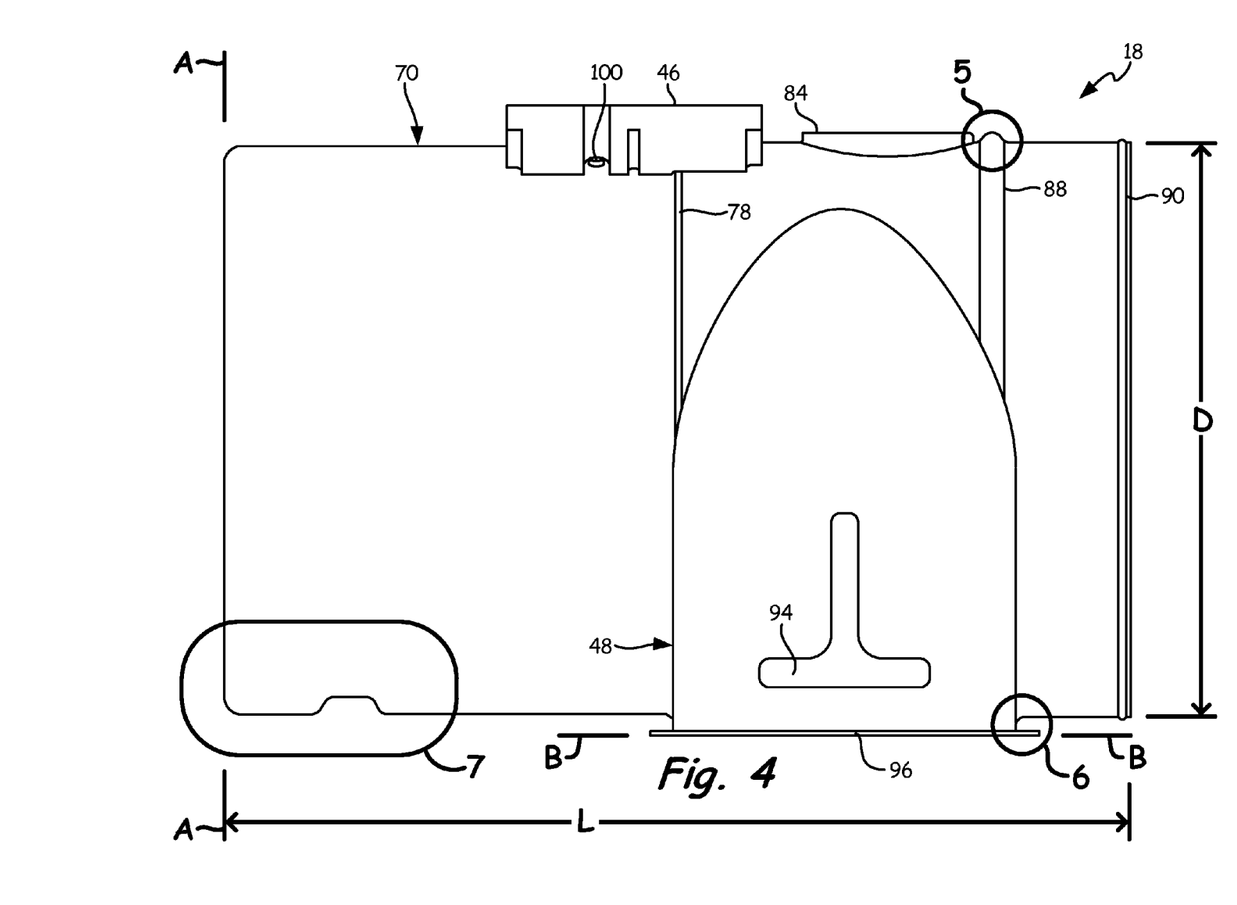
FIG. 4 is a side view of the outer housing of FIG. 2.

FIG. 4 is a side view of the outer housing of FIG. 2. FIG. 4 shows terminal box 46 connected to outer cylinder 70 by terminal box bolt 100 through terminal box bolt holes 82 as shown in FIG. 2. Terminal box 46 is also secured to outer cylinder 70 by a permanent adhesive. As noted in reference to FIG. 2, outer cylinder 70 has a ram air fan rotor end (at inlet flange 72) and a ram air fan outlet end (near outlet bead 90) at opposite ends of an axis of outer cylinder 70. The outer surface of inlet flange 72 defines reference flange plane A, which is perpendicular to the axis of outer cylinder 70. As also noted above, outer cylinder 70 has two external diameters, the first external diameter extending from the ram air fan outlet end to diameter transition 78 and the second external diameter extending from diameter transition 78 to the ram air fan rotor end at reference flange plane A. The second external diameter is determined by the size of the components contained within, such as fan housing 12, bearing housing 14, inner housing 20 and diffuser 50, and the volume of ram air from the fan inlet to be moved by fan rotor 42. In embodiments of the present invention, the first external diameter is greater than the second external diameter to provide efficient flow of ram air from both the fan inlet and the bypass inlet to the fan outlet. However, because the greater external diameter of the first external diameter also increases mechanical stresses on outer housing 18, the external length of outer cylinder 70, and thus the external length of outlet housing 18, is reduced relative to the first external diameter to reduce mechanical stresses on outlet housing 18. Thus, embodiments of the present invention have a ratio of external length (L) to external diameter (D) that is relatively small, the external diameter being the first external diameter of outer cylinder 70 and the external length measured from the ram air fan rotor end to the ram air fan outlet end of outer housing 18 in a direction parallel to the axis of outer cylinder 70, as shown in FIG. 4. In one embodiment, the ratio of external length to external diameter is no greater than 1.5827. In another embodiment, the ratio of external length to external diameter is no greater than 1.5827 and no less than 1.5720. In yet another embodiment, the external length of outer housing 18 is between 26.755 inches and 26.875 inches (or between 679.58 mm and 682.63 mm) and the external diameter is between 16.980 inches and 17.020 inches (or between 431.29 mm and 432.31 mm).

FIG. 4 also illustrates additional details of plenum ridges 94 (one shown). In the embodiment shown in FIG. 4, plenum ridges 94 are shaped in an inverted "T" to provide suitable rigidity in the two primary dimensions the two largest flat walls of plenum 48, preventing them from buckling under high or low pressure conditions.

Figure 5:
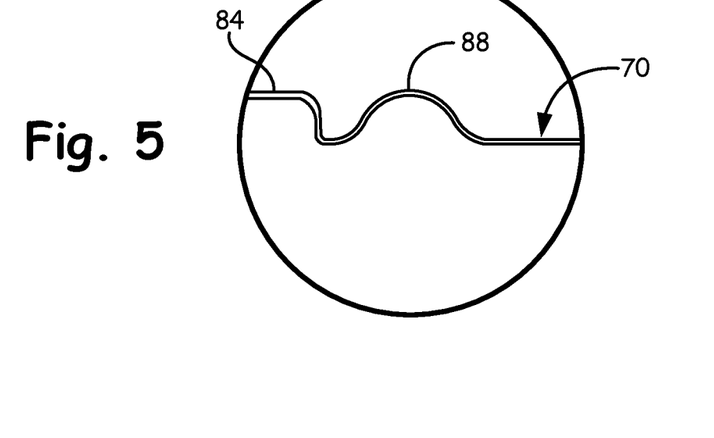
FIG. 5 is a cross-sectional view of a portion of the outer housing of FIG. 4.

FIG. 5 is a cross-sectional view of a portion of the outer housing of FIG. 4. FIG. 5 shows details of outer cylinder support ridge 88. As noted above, outer cylinder support ridge 88 is a portion of outer cylinder 70 shaped for mechanical support of outer cylinder 70. FIG. 5 illustrates that outer cylinder support ridge 88 is formed by roughly semicircular-shaped protrusion of outer cylinder 70. Much as plenum ridges 94 are protruding portions of large wall sections of plenum 48 for providing structural support for plenum 48, outer cylinder support ridge 88 is a protruding section of outer cylinder 70 to provide mechanical support for outer cylinder 70. In one embodiment of the present invention, outer cylinder support ridge 88 protrudes between 0.290 inches and 0.310 inches (or between 7.37 mm and 7.87 mm) radially outward from the external diameter of outer cylinder 70. Alternatives to outer cylinder support ridge 88, such as adding mechanical components or thickening the wall of outer cylinder 70, would add expense and weight. Forming outer cylinder support ridge 88 into outer cylinder 70 provides additional mechanical strength to outer cylinder 70 with little added weight or expense.

Outer cylinder 70 and plenum 48 are made of laminations of plain-weave carbon-fiber sheets. Carbon-fibers are known for tremendous tensile strength for their size and weight. Plain-weave carbon-fiber sheets have bundles of carbon-fiber filaments, know as a strand, woven into a sheet using a plain-weave pattern such that half of the strands are oriented in a first direction, for example, a 0 degree direction, and the other half of the filaments are oriented in a second direction, the second direction at a right angle to the first direction, for example, 90 degrees. This weave orientation provides tensile strength in the 0 degree and 90 degree directions. By laminating several sheets together by employing resins noted for strength at high temperatures, structures with high strength and relatively low weight can be built up. In all embodiments of the present invention, all walls of outer cylinder 70 and plenum 48 are comprised of at least four layers, or plies, of plain-weave carbon-fiber fabric. The four plies are assembled in a unique laminate stacking sequence to provide excellent tensile strength in more than 0 degree and 90 degree directions. The laminate stacking sequence is such that a first layer and a fourth layer are oriented forty-five degrees from each of a second layer and a third layer, the second layer and the third layer sandwiched between the first layer and the fourth layer. For example, if the first layer has a weave orientation such that its strands are oriented in 0 degree and 90 degree directions (orientation A), then the next two plies in the laminate stacking sequence must have weave orientations such that the strands of each ply are oriented in +45 degree and −45 degree directions (orientation B). The fourth layer in the laminate stacking sequence must have a weave orientation such that its strands are oriented in 0 degree and 90 degree directions (orientation A). This laminate stacking sequence is abbreviated as A-B-B-A, and is employed throughout outer cylinder 70 and plenum 48 to create walls with a thickness of, for example, about 0.026 inches (or about 0.66 mm), that are strong, but lightweight.

Figure 6:
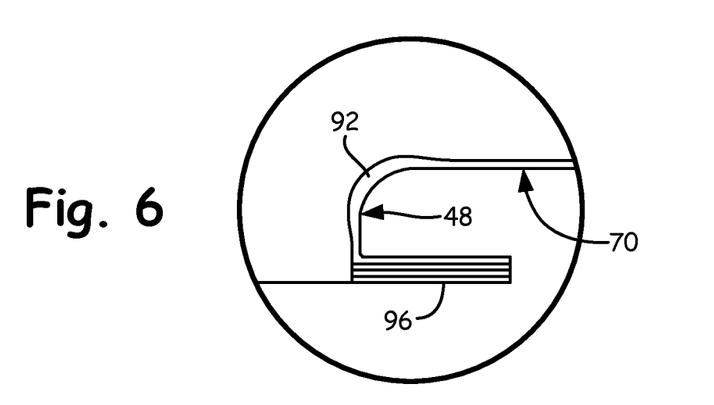
FIG. 6 is a cross-sectional view of another portion of the outer housing of FIG. 4.

FIG. 6 is a cross-sectional view of another portion of the outer housing of FIG. 4. FIG. 6 shows details of cylinder-to-plenum joint 92 and plenum flange 96. Cylinder-to-plenum joint 92 is an important joint where significant mechanical stress associated with outer cylinder 70 is transferred to plenum 48. Cylinder-to-plenum joint 92 includes a unique laminate stacking sequence that interleaves A-B-B-A stacking sequences from walls in adjacent outer cylinder 70 and plenum 48 to form a lamination of eight layers of plain-weave carbon-fiber fabric. Thus, at cylinder-to-plenum joint 92, the laminate stacking sequence is A-A-B-B-B-B-A-A. This laminate stacking sequence with eight layers provides the necessary additional strength to support the level of mechanical stress experienced by cylinder-to-plenum joint 92. The interleaving of eight layers extends into each of outer cylinder 70 and plenum 48 to a degree sufficient to insure a strong joint. In one embodiment, the interleaving of eight layers extends into each of outer cylinder 70 and plenum 48 to at least 0.500 inches (or at least 2.70 mm) beyond any point where outer cylinder 70 or plenum 48 forms a tangent to a radius of curvature of cylinder-to-plenum joint 92. In another embodiment, the interleaving of eight layers extends into each of outer cylinder 70 and plenum 48 to between 0.500 inches and 2.000 inches (or between 12.70 mm and 50.80 mm) beyond any point where outer cylinder 70 or plenum 48 forms a tangent to a radius of curvature of cylinder-to-plenum joint 92. This laminate stacking sequence with eight layers and weave orientations of A-A-B-B-B-B-AA provides the necessary additional strength to support the level of mechanical stress experienced by cylinder-to-plenum joint 92, while maintaining a lightweight structure.

In contrast to walls and joints, flanges of outer housing 18 must be much thicker to withstand mechanical stresses associated with the flange connections. As shown in FIG. 6, plenum flange 96 is much thicker than the wall of plenum 48. This is achieved by building up plies of plain-weave carbon-fiber fabric in the laminate stacking sequence A-B-B-A, and repeating this laminate stacking sequence until reaching a final target thickness of plenum flange 96. For example, to build up plenum flange 96 to a thickness of between 0.100 inches and 0.140 inches (or between 2.5 mm and 3.6 mm) with A-B-B-A stacking sequences having a nominal thickness of 0.026 inches (or of 6.6 mm), between four and five of the A-B-B-A sequences would be employed.

Figure 7:
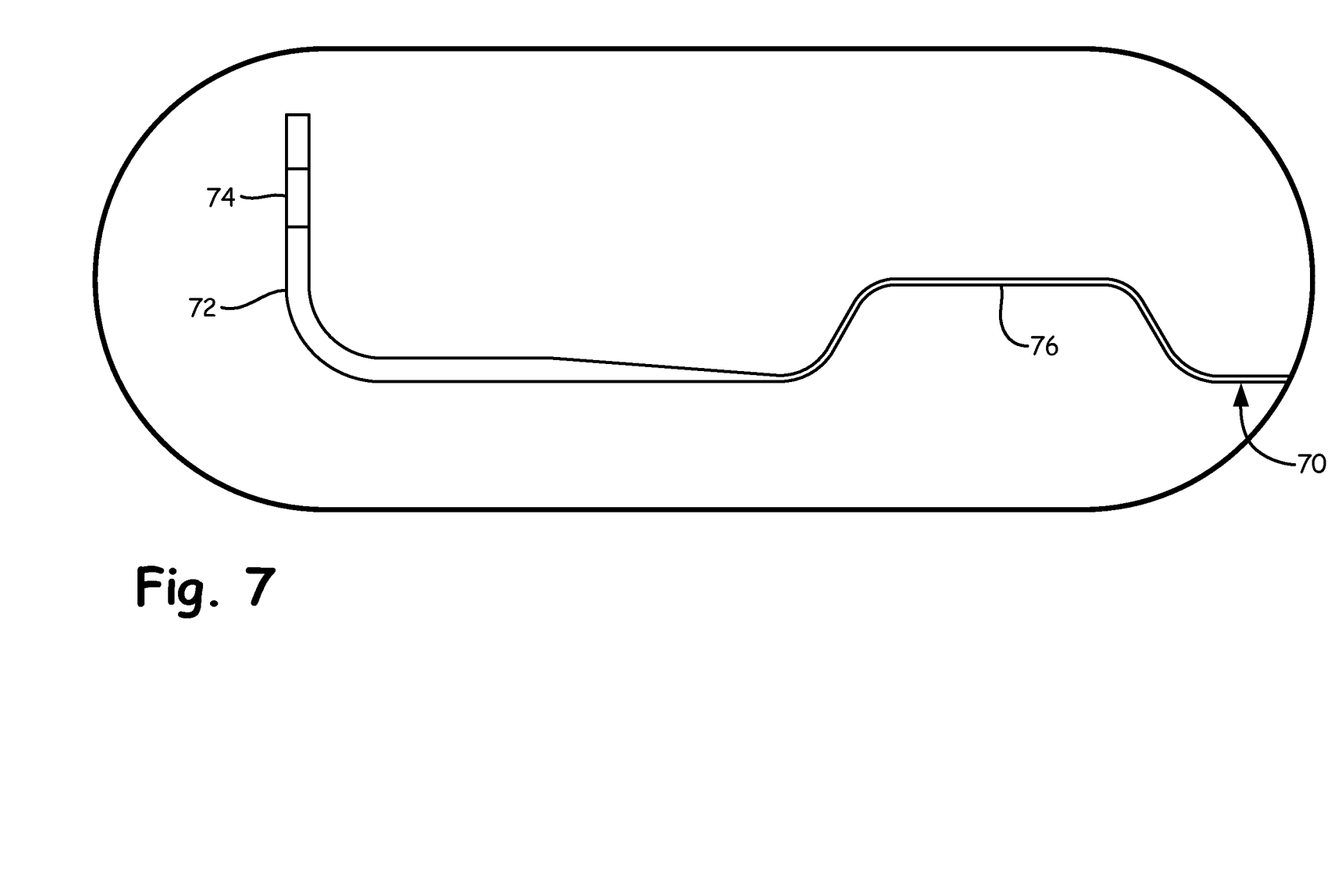
FIG. 7 is a cross-sectional view of another portion of the outer housing of FIG. 4.

FIG. 7 is a cross-sectional view of another portion of the outer housing of FIG. 4. FIG. 7 shows inlet flange 72 and one of the plurality of inlet flange bolt holes 74 Like plenum flange 96 described above in reference to FIG. 6, inlet flange 72 must be much thicker than the wall of outer cylinder 70 to withstand mechanical stresses associated with a flange connection. Also like plenum flange 96, inlet flange 72 is also created by building up plies of plain-weave carbon-fiber fabric in the laminate stacking sequence A-B-B-A, and repeating this stacking sequence until reaching a final target thickness. As shown in FIG. 7, for inlet flange 72, this thickness extends from inlet flange 72 into a wall section of outer cylinder 70, where the extra plies drop off until the single A-B-B-A wall thickness of outer cylinder 70 is reached.

The present invention is a ram air fan outer housing that is durable, while also being lightweight. An outer housing embodying the present invention is made out of fiber-reinforced polymer composite plies, such as carbon-fiber plies, oriented in a laminate stacking sequence of A-B-B-A, creating very strong and lightweight walls. By interleaving laminate stacking sequences from the outer cylinder and the plenum across the joint between the two, a strong eight ply laminate stacking sequence is created to handle the mechanical stresses of the joint. Portions of the outer cylinder and the plenum are mechanically reinforced with raised features, such as plenum ridges and an outer cylinder support ridge to provide extra mechanical strength where needed without adding significant weight or cost. Finally, the outer housing is designed with an exceptionally small ratio of the external length of the outer cylinder to the external diameter of the outer cylinder at the ram air fan outlet. The relatively large outer cylinder diameter at the ram air fan outlet enables efficient fan flow. Keeping the length of the outer cylinder relatively short reduces stresses on the outer housing, particularly the joint between the outer cylinder and the plenum. By reducing stresses, less material is required to reinforce these joints, contributing to a relatively lightweight outer housing.

Novel aspects of outer housing 18, including outer cylinder 70 and plenum 48 of the present invention described herein are achieved by substantial conformance to specified geometries. It is understood that edge breaks and curved radii not specifically described herein, but normally employed in the art, may be added to outer housing 18 to enhance manufacturability, ease assembly, or improve durability while retaining substantial conformance to specified geometries.

Alternatively, substantial conformance is based on a determination by a national or international regulatory body, for example in a part certification or parts manufacture approval (PMA) process for the Federal Aviation Administration, the European Aviation Safety Agency, the Civil Aviation Administration of China, the Japan Civil Aviation Bureau, or the Russian Federal Agency for Air Transport. In these embodiments, substantial conformance encompasses a determination that a particular ram air fan outer housing is identical to, or sufficiently similar to, the specified outer housing 18 comprising outer cylinder 70 and plenum 48, or that the ram air fan outer housing is sufficiently the same with respect to a part design in a type-certified ram air fan outer housing, such that the ram air fan outer housing complies with airworthiness standards applicable to the specified ram air fan outer housing. In particular, substantial conformance encompasses any regulatory determination that a particular part or structure is sufficiently similar to, identical to, or the same as a specified outer housing 18 of the present invention, such that certification or authorization for use is based at least in part on the determination of similarity.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ram air fan outer housing for directing air from a ram air fan rotor and air from a ram air bypass into a ram air fan outlet, the outer housing comprising:
   an outer cylinder having a ram air fan rotor end and a ram air fan outlet end, the ram air fan rotor end and the ram air fan outlet end at opposite ends of an axis of the outer cylinder; the outer cylinder including walls comprised of a laminate stacking sequence of at least four adjacent outer cylinder layers of plain-weave carbon-fiber fabric, each layer of the four adjacent outer cylinder layers having a weave orientation such that a first outer cylinder layer and a fourth outer cylinder layer are oriented forty-five degrees from each of a second outer cylinder layer and a third outer cylinder layer, the second outer cylinder layer and the third outer cylinder layer sandwiched between the first outer cylinder layer and the fourth outer cylinder layer, wherein the outer cylinder further includes an outer cylinder support ridge extending along at least a portion of the outer cylinder in a plane perpendicular to the axis of the cylinder, and comprising a protruding section of the outer cylinder wall; and
   a plenum for directing air from the ram air bypass into the outer cylinder, the plenum including walls comprised of a laminate stacking sequence of at least four adjacent plenum layers of plain-weave carbon-fiber fabric, each layer of the four adjacent plenum layers having a weave orientation such that a first plenum layer and a fourth plenum layer are oriented forty-five degrees from each of a second plenum layer and a third plenum layer, the second plenum layer and the third plenum layer sandwiched between the first plenum layer and the fourth plenum layer, wherein the plenum is joined to the outer cylinder at a joint region, the joint region comprised of a laminate stacking sequence of at least eight adjacent layers of plain-weave carbon-fiber fabric, the joint region laminate stacking sequence formed by interleaving the four adjacent outer cylinder layers in the joint region with the four adjacent plenum layers in the joint region.

2. The outer housing of claim 1, wherein a ratio of an external length of the outer cylinder to an external diameter of the outer cylinder at the ram air fan outlet end is no greater than 1.5827, wherein the external length of the outer cylinder is a distance from the ram air fan rotor end to the ram air fan outlet end in a direction parallel to the axis of the outer cylinder.

3. The outer housing of claim 1, wherein a ratio of an external length of the outer cylinder to an external diameter of the outer cylinder at the ram air fan outlet end is no greater than 1.5827 and no less than 1.5720, wherein the external length of the outer cylinder is a distance from the ram air fan rotor end to the ram air fan outlet end in a direction parallel to the axis of the outer cylinder.

4. The outer housing of claim 1, wherein an external length of the outer cylinder is between 26.755 inches and 26.875 inches (or between 679.58 mm and 682.63 mm) and an external diameter of the outer cylinder at the ram air fan outlet is between 16.980 inches and 17.020 inches (or between 431.29 mm and 432.31 mm).

5. The outer housing of claim 1, wherein the joint region extends into each of the outer cylinder and the plenum to at least 0.500 inches (or at least 12.7 mm) beyond any point where the outer cylinder or the plenum forms a tangent to a radius of curvature of the joint region.

6. The outer housing of claim 1, wherein the joint region extends into each of the outer cylinder and the plenum to between 0.500 inches and 2.000 inches (or between 12.70 mm and 50.80 mm) beyond any point where the outer cylinder or the plenum forms a tangent to a radius of curvature of the joint region.

7. The outer housing of claim 1, wherein the plenum further comprises two plenum ridges, one at each of two walls of the plenum, the two walls of the plenum being parallel to the axis of the outer cylinder; wherein each of the two plenum ridges comprises a protruding section of the corresponding plenum wall.

8. The outer housing of claim 7, wherein the plenum ridges protrude to planes parallel to each other, and between 12.450 inches and 12.470 inches (or between 316.230 mm and 316.738 mm) from a parallel plane containing the axis of the outer cylinder.

9. The outer housing of claim 7, wherein the plenum ridges each form an inverted T shape.

10. The outer housing of claim 1, wherein the outer cylinder support ridge protrudes between 0.290 inches and 0.310 inches (or between 7.37 mm and 7.87 mm) radially outward from the outer cylinder wall.

11. A ram air fan assembly comprising:
a fan housing;
a fan motor attached to the fan housing;
a fan rotor;
a thrust shaft connecting the fan motor to the fan rotor;
an inlet housing connected to the fan housing;
a bearing housing attached to the fan housing;
an inner housing attached to the bearing housing; and
an outer housing connected to the fan housing and containing the bearing housing, the inner housing, and a portion of the fan housing; for directing air from fan rotor and air from a ram air bypass into a ram air fan outlet; the outer housing comprising:
an outer cylinder having a ram air fan rotor end connected to the fan housing and a ram air fan outlet end, the ram air fan rotor end and the ram air fan outlet end at opposite ends of an axis of the outer cylinder; the outer cylinder including walls comprised of a laminate stacking sequence of at least four adjacent outer cylinder layers of plain-weave carbon-fiber fabric, each layer of the four adjacent outer cylinder layers having a weave orientation such that a first outer cylinder layer and a fourth outer cylinder layer are oriented forty-five degrees from each of a second outer cylinder layer and a third outer cylinder layer, the second outer cylinder layer and the third outer cylinder layer sandwiched between the first outer cylinder layer and the fourth outer cylinder layer, wherein the outer cylinder further includes an outer cylinder support ridge extending along at least a portion of the outer cylinder in a plane perpendicular to the axis of the cylinder, and comprising a protruding section of the outer cylinder wall; and
a plenum for directing air from the ram air bypass into the outer cylinder, the plenum including walls comprised of a laminate stacking sequence of at least four adjacent plenum layers of plain-weave carbon-fiber fabric, each layer of the four adjacent plenum layers having a weave orientation such that a first plenum layer and a fourth plenum layer are oriented forty-five degrees from each of a second plenum layer and a third plenum layer, the second plenum layer and the third plenum layer sandwiched between the first plenum layer and the fourth plenum layer,
wherein the plenum is joined to the outer cylinder at a joint region, the joint region comprised of a laminate stacking sequence of at least eight adjacent layers of plain-weave carbon-fiber fabric, the joint region laminate stacking sequence formed by interleaving the four adjacent outer cylinder layers in the joint region with the four adjacent plenum layers in the joint region.

12. The ram air fan assembly of claim 11, wherein a ratio of an external length of the outer cylinder to an external diameter of the outer cylinder at the ram air fan outlet end is no greater than 1.5827, wherein the external length of the outer cylinder is a distance from the ram air fan rotor end to the ram air fan outlet end in a direction parallel to the axis of the outer cylinder.

13. The ram air fan assembly of claim 11, wherein a ratio of an external length of the outer cylinder to an external diameter of the outer cylinder at the ram air fan outlet end is no greater than 1.5827 and no less than 1.5720, wherein the external length of the outer cylinder is a distance from the ram air fan rotor end to the ram air fan outlet end in a direction parallel to the axis of the outer cylinder.

14. The ram air fan assembly of claim 11, wherein an external length of the outer cylinder is between 26.755 inches and 26.875 inches (or between 679.58 mm and 682.63 mm) and an external diameter of the outer cylinder at the ram air fan outlet is between 16.980 inches and 17.020 inches (or between 431.29 mm and 432.31 mm).

15. The ram air fan assembly of claim 11, wherein the joint region extends into each of the outer cylinder and the plenum to at least 0.500 inches (or at least 12.7 mm) beyond any point where the outer cylinder or the plenum forms a tangent to a radius of curvature of the joint region.

16. The ram air fan assembly of claim 11, wherein the joint region extends into each of the outer cylinder and the plenum to between 0.500 inches and 2.000 inches (or between 12.70 mm and 50.80 mm) beyond any point where the outer cylinder or the plenum forms a tangent to a radius of curvature of the joint region.

17. The ram air fan assembly of claim 11, wherein the plenum further comprises two plenum ridges, one at each of two walls of the plenum, the two walls of the plenum being parallel to the axis of the outer cylinder; wherein each of the two plenum ridges comprises a protruding section of the corresponding plenum wall.

18. The ram air fan assembly of claim 17, wherein the plenum ridges protrude to planes parallel to each other, and between 12.450 inches and 12.470 inches (or between 316.230 mm and 316.738 mm) from a parallel plane containing the axis of the outer cylinder.

19. The ram air fan assembly of claim 17, wherein the plenum ridges each form an inverted T shape.

20. The ram air fan assembly of claim 11, wherein the first outer cylinder support ridge protrudes between 0.290 inches and 0.310 inches (or between 7.37 mm and 7.87 mm) radially outward from the outer cylinder wall.

21. A ram air fan outer housing for directing air from a ram air fan rotor and air from a ram air bypass into a ram air fan outlet, the outer housing comprising:
    an outer cylinder having a ram air fan rotor end and a ram air fan outlet end, the ram air fan rotor end and the ram air fan outlet end at opposite ends of an axis of the outer cylinder; the outer cylinder including walls comprised of a laminate stacking sequence of at least four adjacent outer cylinder layers of plain-weave carbon-fiber fabric, each layer of the four adjacent outer cylinder layers having a weave orientation such that a first outer cylinder layer and a fourth outer cylinder layer are oriented forty-five degrees from each of a second outer cylinder layer and a third outer cylinder layer, the second outer cylinder layer and the third outer cylinder layer sandwiched between the first outer cylinder layer and the fourth outer cylinder layer; and
    a plenum for directing air from the ram air bypass into the outer cylinder, the plenum including walls comprised of a laminate stacking sequence of at least four adjacent plenum layers of plain-weave carbon-fiber fabric, each layer of the four adjacent plenum layers having a weave orientation such that a first plenum layer and a fourth plenum layer are oriented forty-five degrees from each of a second plenum layer and a third plenum layer, the second plenum layer and the third plenum layer sandwiched between the first plenum layer and the fourth plenum layer,
        wherein the plenum is joined to the outer cylinder at a joint region, the joint region comprised of a laminate stacking sequence of at least eight adjacent layers of plain-weave carbon-fiber fabric, the joint region laminate stacking sequence formed by interleaving the four adjacent outer cylinder layers in the joint region with the four adjacent plenum layers in the joint region, and
        wherein the plenum further comprises two plenum ridges, one at each of two walls of the plenum, the two walls of the plenum being parallel to the axis of the outer cylinder; wherein each of the two plenum ridges comprises a protruding section of the corresponding plenum wall.

22. The outer housing of claim 21, wherein a ratio of an external length of the outer cylinder to an external diameter of the outer cylinder at the ram air fan outlet end is no greater than 1.5827, wherein the external length of the outer cylinder is a distance from the ram air fan rotor end to the ram air fan outlet end in a direction parallel to the axis of the outer cylinder.

23. The outer housing of claim 21, wherein a ratio of an external length of the outer cylinder to an external diameter of the outer cylinder at the ram air fan outlet end is no greater than 1.5827 and no less than 1.5720, wherein the external length of the outer cylinder is a distance from the ram air fan rotor end to the ram air fan outlet end in a direction parallel to the axis of the outer cylinder.

24. The outer housing of claim 21, wherein an external length of the outer cylinder is between 26.755 inches and 26.875 inches (or between 679.58 mm and 682.63 mm) and an external diameter of the outer cylinder at the ram air fan outlet is between 16.980 inches and 17.020 inches (or between 431.29 mm and 432.31 mm).

25. The outer housing of claim 21, wherein the joint region extends into each of the outer cylinder and the plenum to at least 0.500 inches (or at least 12.7 mm) beyond any point where the outer cylinder or the plenum forms a tangent to a radius of curvature of the joint region.

26. The outer housing of claim 21, wherein the joint region extends into each of the outer cylinder and the plenum to between 0.500 inches and 2.000 inches (or between 12.70 mm and 50.80 mm) beyond any point where the outer cylinder or the plenum forms a tangent to a radius of curvature of the joint region.

27. A ram air fan assembly comprising:
    a fan housing;
    a fan motor attached to the fan housing;
    a fan rotor;
    a thrust shaft connecting the fan motor to the fan rotor;
    an inlet housing connected to the fan housing;
    a bearing housing attached to the fan housing;
    an inner housing attached to the bearing housing; and
    an outer housing connected to the fan housing and containing the bearing housing, the inner housing, and a portion of the fan housing; for directing air from fan rotor and air from a ram air bypass into a ram air fan outlet; the outer housing comprising:
    an outer cylinder having a ram air fan rotor end connected to the fan housing and a ram air fan outlet end, the ram air fan rotor end and the ram air fan outlet end at opposite ends of an axis of the outer cylinder; the outer cylinder including walls comprised of a laminate stacking sequence of at least four adjacent outer cylinder layers of plain-weave carbon-fiber fabric, each layer of the four adjacent outer cylinder layers having a weave orientation such that a first outer cylinder layer and a fourth outer cylinder layer are oriented forty-five degrees from each of a second outer cylinder layer and a third outer cylinder layer, the second outer cylinder layer and the third outer cylinder layer sandwiched between the first outer cylinder layer and the fourth outer cylinder layer; and
    a plenum for directing air from the ram air bypass into the outer cylinder, the plenum including walls comprised of a laminate stacking sequence of at least four adjacent plenum layers of plain-weave carbon-fiber fabric, each layer of the four adjacent plenum layers having a weave orientation such that a first plenum layer and a fourth plenum layer are oriented forty-five degrees from each of a second plenum layer and a third plenum layer, the second plenum layer and the third plenum layer sandwiched between the first plenum layer and the fourth plenum layer, wherein the plenum is joined to the outer cylinder at a joint region, the joint region comprised of a laminate stacking sequence of at least eight adjacent layers of plain-weave carbon-fiber fabric, the joint region laminate stacking sequence formed by interleaving the four adjacent outer cylinder layers in the joint region with the four adjacent plenum layers in the joint region, and wherein the plenum further comprises two plenum ridges, one at each of two walls of the plenum, the two walls of the plenum being parallel to the axis of the outer cylinder; wherein each of the two plenum ridges comprises a protruding section of the corresponding plenum wall.

28. The ram air fan assembly of claim 27, wherein a ratio of an external length of the outer cylinder to an external diameter of the outer cylinder at the ram air fan outlet end is no greater than 1.5827, wherein the external length of the outer cylinder is a distance from the ram air fan rotor end to the ram air fan outlet end in a direction parallel to the axis of the outer cylinder.

29. The ram air fan assembly of claim 27, wherein a ratio of an external length of the outer cylinder to an external diameter of the outer cylinder at the ram air fan outlet end is no greater than 1.5827 and no less than 1.5720, wherein the external length of the outer cylinder is a distance from the ram air fan rotor end to the ram air fan outlet end in a direction parallel to the axis of the outer cylinder.

30. The ram air fan assembly of claim 27, wherein an external length of the outer cylinder is between 26.755 inches and 26.875 inches (or between 679.58 mm and 682.63 mm) and an external diameter of the outer cylinder at the ram air fan outlet is between 16.980 inches and 17.020 inches (or between 431.29 mm and 432.31 mm).

31. The ram air fan assembly of claim 27, wherein the joint region extends into each of the outer cylinder and the plenum to at least 0.500 inches (or at least 12.7 mm) beyond any point where the outer cylinder or the plenum forms a tangent to a radius of curvature of the joint region.

32. The ram air fan assembly of claim 27, wherein the joint region extends into each of the outer cylinder and the plenum to between 0.500 inches and 2.000 inches (or between 12.70 mm and 50.80 mm) beyond any point where the outer cylinder or the plenum forms a tangent to a radius of curvature of the joint region.

* * * * *

UNITED STATES PATENT AND TRADEMARK OFFICE
CERTIFICATE OF CORRECTION

| | | |
|---|---|---|
| PATENT NO. | : 9,140,272 B2 | Page 1 of 1 |
| APPLICATION NO. | : 13/279508 | |
| DATED | : September 22, 2015 | |
| INVENTOR(S) | : Binek et al. | |

It is certified that error appears in the above-identified patent and that said Letters Patent is hereby corrected as shown below:

In the claims

Col. 9, Line 32, Claim 4
  Delete "between679.58"
  Insert -- between 679.58 --

Signed and Sealed this
Twenty-second Day of March, 2016

Michelle K. Lee
*Director of the United States Patent and Trademark Office*